United States Patent [19]

Follmer

[11] 4,188,527
[45] Feb. 12, 1980

[54] AUTOMOTIVE ELECTRIC QUICK HEAT SYSTEM

[75] Inventor: William C. Follmer, Livonia, Mich.
[73] Assignee: Ford Motor Company, Dearborn, Mich.
[21] Appl. No.: 862,705
[22] Filed: Dec. 21, 1977
[51] Int. Cl.² .............................................. B60L 1/02
[52] U.S. Cl. .................................. 219/202; 219/205; 219/497; 219/494; 219/507
[58] Field of Search ............................ 219/202–203, 219/205–209, 279, 307, 364, 483–486, 510; 123/122 F, 142.5 E

[56] References Cited

U.S. PATENT DOCUMENTS

| | | | |
|---|---|---|---|
| 2,320,528 | 6/1943 | Loeffler et al. | 219/206 |
| 2,648,757 | 8/1953 | Harper | 219/510 |
| 3,264,450 | 8/1966 | Wallace | 219/279 |
| 3,300,619 | 1/1967 | Nilssen | 219/279 |
| 3,440,398 | 4/1969 | Nilssen | 219/279 |
| 3,525,853 | 8/1970 | Nilssen | 219/279 X |
| 3,752,348 | 8/1973 | Dickason et al. | 219/203 |
| 3,868,559 | 2/1975 | Hill et al. | 219/202 X |
| 3,915,137 | 10/1975 | Evans | 219/207 X |

*Primary Examiner*—Bruce A. Reynolds
*Assistant Examiner*—M. Paschall
*Attorney, Agent, or Firm*—Paul K. Godwin, Jr.; Clifford L. Sadler

[57] ABSTRACT

An automotive electric quick heat system utilizing a resistive heating element connected in series between the DC output terminal of a driven alternator and the voltage regulated terminal of the main storage battery. A shunting relay is controllable to bypass the resistive heating element when the conventional engine generated heat reaches a predetermined temperature. A first embodiment utilizes the automatic electric quick heat system in the carburetor air intake of an automotive engine. A second embodiment utilizes the automatic electric quick heat system for supplying heat to the passenger compartment following disconnect of the air carburetor intake quick heat.

11 Claims, 3 Drawing Figures

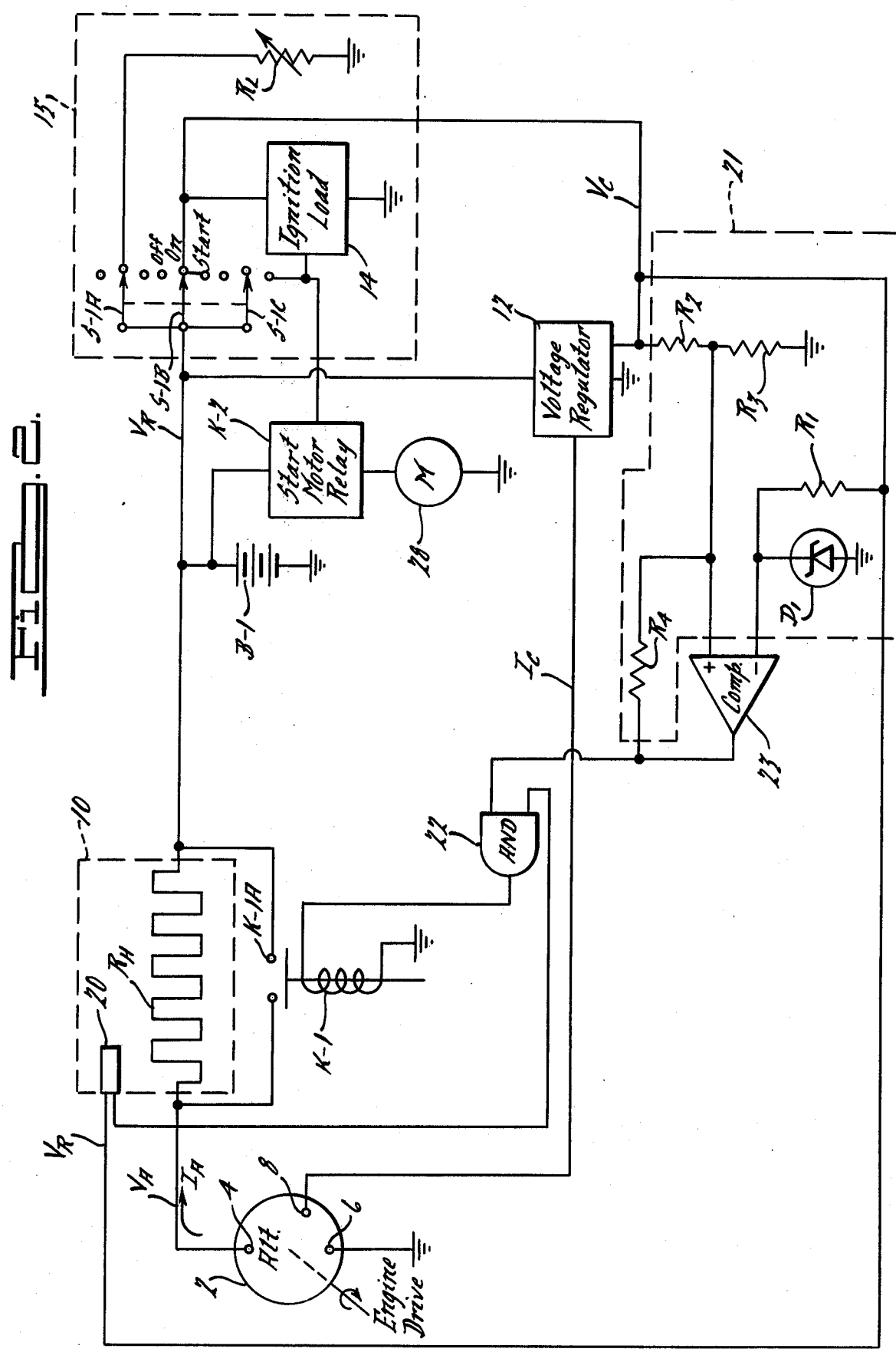

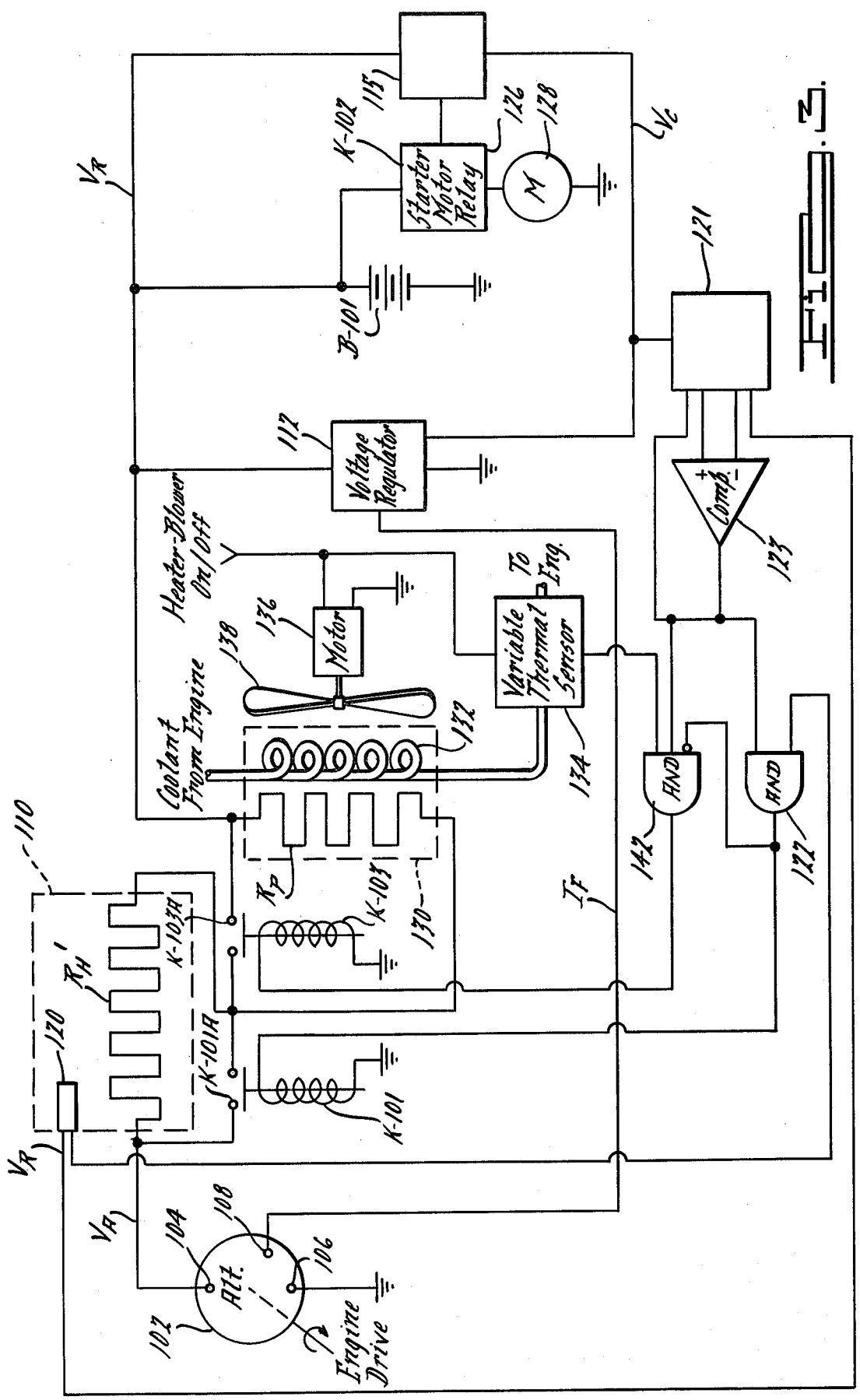

AUTOMOTIVE ELECTRIC QUICK HEAT SYSTEM

BACKGROUND OF THE INVENTION

1. Field of the Invention

The present invention is directed to a system for providing fast warm-up to selected areas of a vehicle, such as the engine air intake, the passenger compartment, or windows thereof.

2. Description of the Prior Art:

Conventional attempts to provide quick heat, such as to passenger compartments of automotive vehicles, generally utilize the three phase AC voltage generated by a driven alternator, prior to its rectification. Such systems are shown in commonly assigned U.S. Pat. No. 3,300,619; U.S. Pat. No. 3,440,398; U.S. Pat. No. 3,264,450; and U.S. Pat. No. 3,525,853. In each of these systems, a low impedance heating load is switched to divert power for quick heating purposes. In the aforementioned prior art systems, the alternator is operated in either a regulated mode, which supplies a predetermined value of DC output voltage directly to the battery charging system, or in an unregulated mode when the heating elements are connected.

Prior art attempts to vaporize fuel for an internal combustion engine by employing an electric heat generating coil are disclosed in U.S. Pat. No. 3,915,137. However, in that disclosure, the heater is connected directly across the main storage battery.

Prior art attempts to provide sufficient power for heated backlights and the like, are further shown in commonly assigned U.S. Pat. No. 3,752,348, wherein the heating elements are connected to the AC output of the alternator.

SUMMARY OF THE INVENTION

As indicated, by the prior art discussed above, there is a need for a reliable source of high energy to supply heat to various vehicle locations immediately upon the starting of the vehicle engine. For instance, for the first few minutes after starting a cold engine the air-fuel mixture is extremely rich due to choking. This condition exists until the incoming air or the air-fuel mixture is heated sufficiently, by the exhaust manifold or other engine heat recirculating devices well known in the art, to facilitate vaporization. Generally, the first two minutes, following a cold engine start-up, account for the worst case of excessive pollutant emissions during engine operation. Therefore, the use of quick heat in the engine air intake is desirable to reduce choking time, inefficient fuel use and the resultant high pollutant emissions. In the present invention, when the engine heat recirculating device reaches a temperature for normal engine operation, the air intake quick heat energy may then be switched off, and, if desired, that energy may then be applied to other quick heat elements such as passenger compartment heaters or window defrosters.

The present invention departs from the prior art by effecting a power match between the vehicle alternator and the vehicle load, while simultaneously obtaining quick heat power and a regulated voltage for charging the battery, energizing the engine ignition, and operating the various vehicle accessories.

Each of the novel embodiments, discussed in detail below, are the result of the applicant recognizing the alternator's inherent ability to vary its DC output voltage, for a constant speed of rotation and field coil current, in response to changes in its load. Quick heat is therefore achieved by applying a resistive heater element in series between the alternator DC output and the voltage regulated terminal of the vehicle rechargeable storage battery. A conventional voltage regulator is connected to regulate the field current of the alternator while sensing the voltage value at the common electrical connection between the quick heat load, the battery, and the vehicle load. In this manner, when the vehicle is running and a quick heat element is switched in series, the alternator is controlled by the voltage regulator to produce a voltage at the resistive quick heat element sufficiently high enough so that the voltage at the battery will be the predetermined regulated voltage value. Since all the current demanded by the vehicle to charge the battery and to operate the vehicle ignition and accessory loads flows through the quick heat element, that element will dissipate a value of power dependent upon that current value and the element's resistance value. The remaining power is dissipated in the battery recharge, ignition system and accessory loads. This constitutes a power match of the alternator and achieves the desired quick heat plus a continuously regulated voltage for the normal electrical demands of the vehicle.

In order to prevent battery discharge in the event the vehicle load exceeds that for which adequate voltage may be supplied by the alternator, a circuit is provided to shunt the quick heat element.

It is, therefore, an object of the present invention to provide a novel quick heat system for an automotive vehicle.

It is also an object of the present invention to selectively provide a resistive heating element in series between a rectified alternator output terminal and the voltage regulated load in an automotive vehicle electrical system to obtain significant power dissipation therefrom, while maintaining the regulated voltage at a predetermined value.

It is a further object of the present invention to provide a system for supplying instantaneous heat to the air intake of an automotive engine when the intake air is below a predetermined value.

BRIEF DESCRIPTION OF THE DRAWINGS

FIG. 2 is a schematic diagram of a first embodiment of the present invention wherein quick heat is supplied to the air intake of an automotive engine.

FIG. 3 is a schematic diagram of the second embodiment of the present invention wherein a plurality of heater elements are employed to supply quick heat in priority sequence to designated areas of a vehicle.

DETAILED DESCRIPTION OF THE PREFERRED EMBODIMENTS

Figure 1:
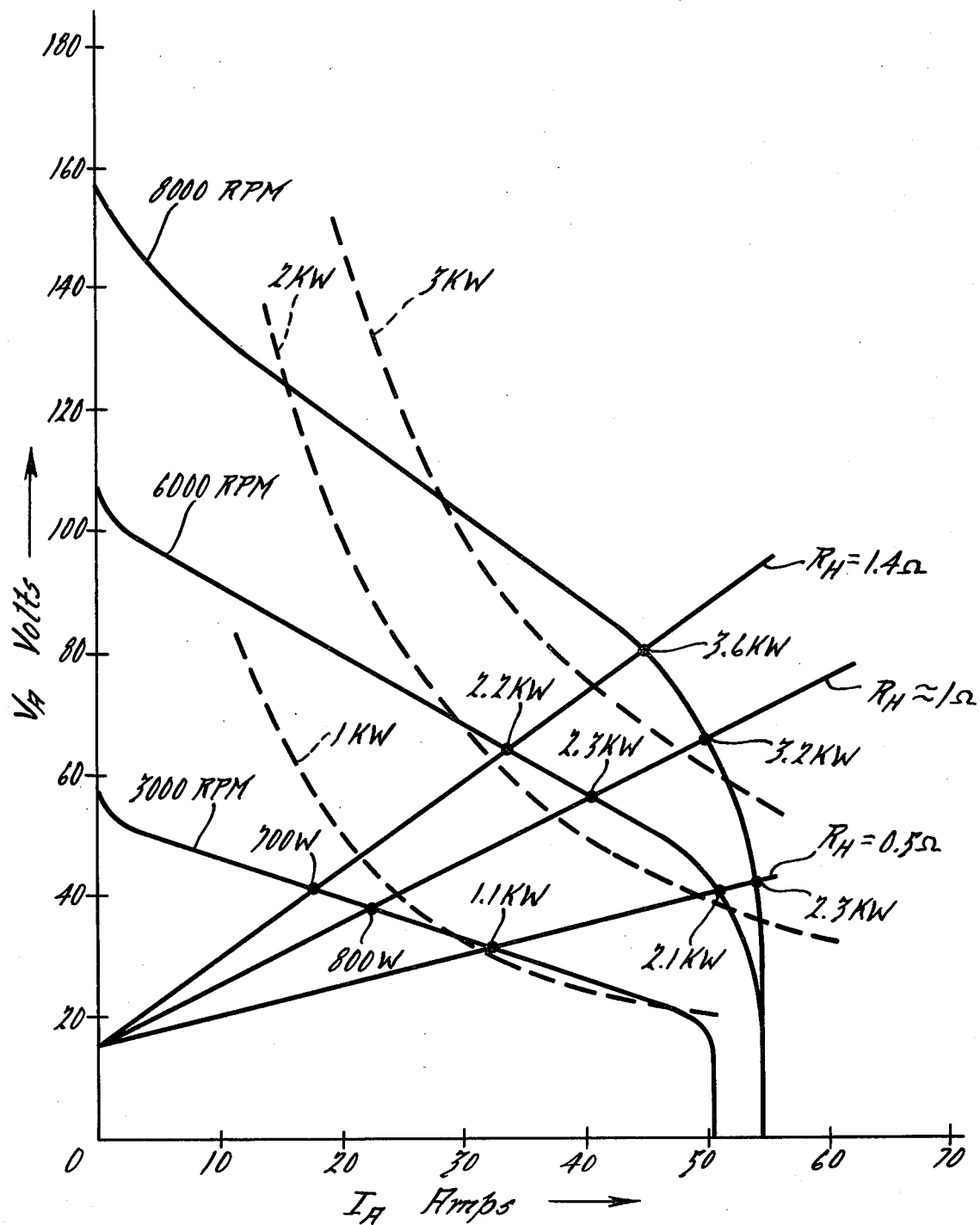
FIG. 1 is a plot of rectified alternator voltage output versus the alternator current output for a typical alternator, as employed in the present invention.

In FIG. 1, V-I curves are shown for a typical 55 amp alternator, of the type commonly employed in the electrical system of an automotive vehicle, for various rotation rates. Assuming a stable field coil current of 3.0 amps, the V-I curves for three selected alternator rotation rates indicate the values of rectified voltage output from the alternator with respect to the corresponding maximum current available at those voltage values. For example, by considering the alternator rotation at 6,000 rpm, it is seen that the alternator is capable of supplying 5 amps at a maximum of 97 volts, 30 amps at a maximum of 67 volts, or 50 amps at a maximum of 42 volts, when the field coil current is 3 amps.

Since, in normal automotive applications, a regulated DC system voltage of a predetermined value is desired to charge the battery, while energizing the ignition system and the various accessories, a voltage regulator is employed to maintain the system voltage by controlling the alternator field coil current from approximately 0 amps to 3 amps. Therefore, assuming a regulated system voltage of 15 volts, it can be seen from FIG. 1 that when the electrical system demands 30 amps, for example, the alternator's power output capability is not being employed to its fullest. In fact, at 6,000 rpm, with a 30 amp demand which dissipates 450 watts on a regulated voltage of 15 volts, the alternator is actually capable of supplying as mjch as 2,010 watts. Therefore, it can be seen that a power difference of 1,560 watts is available for use, through power matching.

One embodiment of the present invention is schematically illustrated in FIG. 2, which makes use of the maximum capabilities of the alternator by employing a resistive heating element in series between the rectified alternator output terminal and the regulated electrical system.

In FIG. 2, an alternator 2 is schematically represented as being rotationally driven by the engine of the vehicle. A DC voltage output terminal 4, supplying the rectified output voltage of the alternator, is connected to both a normally closed relay contact K1-A and a first terminal of a resistive quick heat element $R_H$. The resistive quick heat element $R_H$ is, in this embodiment, located within the carburetor air intake 10 so as to preheat the engine intake air when the intake air is below a predetermined temperature. A temperature sensor 20, such as a bimetallic thermal sensitive switch, is located in the carburetor air intake 10 to monitor the air intake temperature and is connected to a voltage supply to control the electrical switching of the air intake resistive heater element $R_H$. An AND gate 22, when enabled, allows the activation of relay K-1 to thereby open the normally closed contacts K-1A when the air intake temperature is below a predetermined value. Another parallel connection between the second terminal of the resistive quick heat element $R_H$ and normally closed contact K-1A, is electrically connected to the positive terminal of the storage battery B-1. A voltage regulator 12 is also electrically connected to the positive terminal of the battery B-1 to regulate the value of voltage at that point to a maximum of 15 volts, by controlling the field coil current $I_f$, applied to the field coil control terminal 8 on the alternator 2. A regulated load 15 of the vehicle is also electrically connected to the positive terminal of the battery B-1.

The regulated load 15 includes an ignition switch S-1, an ignition load 14, and a variable accessory load $R_L$. The ignition load 14 and the variable accessory load $R_L$ are connected in parallel with the battery B-1 when the ignition switch S-1 is closed. The voltage regulator 12 is also activated by voltage $V_c$ which is derived from the ignition switch S-1.

The ignition switch S-1 is shown as having OFF, ON and START positions. In the START position the ignition switch S-1 connects the positive terminal of the battery B-1 to energize a start motor relay K-2 and connect the start motor 28 directly to the battery B-1. The ignition load 14 is also energized to allow the vehicle engine to start. After start, the ignition switch is placed in the ON position to sustain the ignition of the engine and disconnect the start motor 28.

Of course, as soon as the vehicle engine is started, the alternator 2 is driven to produce an output according to the V-I curves as shown in FIG. 1. Consequently, if the air intake temperature sensed by the sensor 20 is cold (below a predetermined value), the relay K-1 is activated to thereby open contacts K-1A and cause a voltage to be dropped across $R_H$. Quick heat is generated by $R_H$ to effect vaporization of the air-fuel mixture in the carburetor until the conventional exhaust manifold heating system is capable of heating the mixture.

The air intake resistive quick heat element $R_H$ is selected as having a low resistive value of approximately 1 ohm. However, by reference to FIG. 1, it can be seen that other values of $R_H$ can also be used with predictable results. Generally, $R_H$ is chosen to optimize the output power over the expected operating range of the alternator. By utilizing $R_H$ equaling 1 ohm, it is apparent that the amount of power dissipated by resistive quick heat element $R_H$ is dependent upon the amount of current flowing therethrough. Illustratively, as can be seen with reference to the 6,000 RPM curve in FIG. 1, an initial 41 amp load, which is regulated at the positive battery terminal to 15 volts, will cause 41 volts to be applied across the resistive quick heat element $R_H$ to dissipate 1,681 watts thereacross. Of course, as the load demand decreases due to increased charging of the battery and switching certain accessory loads off, the amount of heat dissipated across resistive quick heat element $R_H$ will vary downward over a constant alternator rotation rate. Contrastingly, to a limit, as greater loads are placed across the battery B-1, more current is demanded from the alternator and, as a consequence, higher power is dissipated across the resistive quick heat element $R_H$.

Subsequently, when the air intake temperature reaches a predetermined level, the temperature sensor 20 senses that condition and the relay K-1 is deactivated to shunt the resistive element $R_H$. At that point, the voltage output $V_A$, from the alternator 2, equals the system voltage $V_R$.

As mentioned earlier, it is intended that the quick heat load be connected in series between the alternator and the vehicle load for only a short period of time so as to supplement the regular air intake heating system of the vehicle. With that concept in mind, some sacrifice to the total power available to the normal vehicle electrical system is seen as acceptable. For instance, when the vehicle load demands current greater than the 41 amps at the 6,000 RPM alternator speed and the 1 ohm resistive quick heat element $R_H$ is switched in the circuit, the excess current above 41 amps is contributed by the battery B-1 as discharge current. Of course, if such demands on the system continue for a prolonged period of time, the battery will become discharged. Therefore, in order to prevent such discharge, it is recommednded that a means for detecting battery discharge such as circuit 21 be connected to monitor the voltage at the positive terminal of the battery B-1.

The discharge detection circuit 21, shown in FIG. 2, comprises reference diode $D_1$ which is connected via $R_1$ to the regulated voltage and supplies a fixed voltage to comparator 23. A sample of the regulated voltage is supplied by the voltage divider $R_2$–$R_3$ to the comparator. Should the regulated voltage $V_R$ fall below the value established by $R_2$, $R_3$ and $D_1$ then the comparator goes low, causing $K_1$ to be turned off via AND gate 22.

When $V_R$ rises above the set point established by $D_1$, $R_2$ and $R_3$, $K_1$ will be reenergized. Resistor $R_4$ provides positive feedback which alters the comparator set point slightly, depending on the present comparator output, such that the "turn-on" and "turn-off" voltages are slightly different to minimize control system cycling. Therefore, upon the occurrence of either the temperature in the air intake 10 reaching the predetermined temperature, or $V_R$ falling below a predetermined voltage, relay K-1 will be deactivated to thereby close contacts K-1A and shunt the resistive heater element $R_H$.

If it is desired to eliminate discharge detection circuit 21, comparator 23 and the AND gate 22 may also be eliminated. In that instance, the thermal sensor 20 is connected directly to the coil of relay K-1.

An alternative embodiment, to that shown in FIG. 2, employs a resistive quick heat element mounted in the heat exchanger for a passenger compartment heater so as to provide immediate heat to the air circulated therein until such time as the coolant from the engine is heated sufficiently to provide the normal heating energy. This embodiment is shown in FIG. 3, wherein elements which correspond to those shown in FIG. 2 are given the same number with the addition of 100. For example, voltage regulator 12 in FIG. 2 is shown as voltage regulator 112 in FIG. 3.

The embodiment shown in FIG. 3 should be understood as being also applicable to other quick heat applications for a vehicle, such as for window defoggers or resistive backlights commonly known in the art.

In FIG. 3, the alternator 102 has its DC voltage output terminal 104 connected to a first terminal of the air intake resistive quick heat element $R_{H'}$ and to a first side of a normally closed contact K-101A. The second terminal of element $R_{H'}$ is connected in common with the other side of normally closed contact K-101A, a normally closed contact K-103A and a first terminal of passenger heater quick heat element Rp. In this embodiment, the quick heat element Rp is shown as being located in an engine coolant heat exchanger 130, so as to dissipate heat into the air flow. In this configuration, when normally closed contacts K-101A and K-103A are closed, they provide a shunting line for both resistive elements. Relay K-101 is controlled through AND gate 122, as previously described with respect to FIG. 2, and relay K-103 is controlled, for opening the normally closed contact K-103A, via AND gate 142. One input terminal of AND gate 142 is connected to the output of comparator 123, which monitors the discharge detection circuit 121. In this configuration, if no low voltage condition is sensed, the output of comparator 123 is a high voltage signal, and partially enables AND gate 142. An inverted input terminal of AND gate 142 is connected to the output of AND gate 122 to prevent K-103 from being activated while K-101 is activated.

Coolant fluid from the engine enters the heat exchanger 130 via coil 132 and exists back to the engine while passing a variable thermal sensor 134. The variable thermal sensor in this embodiment, is a bimetallic switch with variable mechanical biasing so that it may be preset to effect turn-off of the resistive element $R_p$ upon reaching a predetermined temperature. However, any thermal sensor, which indicates the engine coolant or circulating air as reaching a temperature level, can be employed with this invention.

Since the thermal sensor 134 is connected to the blower motor 136 power supply, the passenger quick heat element Rp is electrically interlocked to prevent burn out. Such an interlock requires that the blower motor 136, connected to the fan 138, must be energized in order to connect the passenger quick heat element $R_p$ in the circuit.

In operation, and following the air intake quick heat sequence described above with respect to FIG. 2, when the heater blower motor 136 is turned on, relay K-101 is deactivated and no low voltage condition is detected by the discharge detection circuit 21, relay K-103 is energized to cause quick heat dissipation by the resistive heating element $R_p$ until the engine coolant reaches a predetermined temperature. At that point, the thermal sensor 134 causes a deactivation of relay K-103 and thereby shunts $R_p$ to provide a normal vehicle electrical system wherein $V_A = V_R$.

While the above embodiments exemplify the uses which may be made of applicant's basic power matching technique as applied to automotive alternators, they should not be seen as limiting the scope of interpretation of the appended claims.

I claim:

1. In an automotive electrical system, including a storage battery, a mechanically driven alternator having a rectified DC voltage output, a voltage regulator electrically connected between a voltage terminal of said battery and field coil of said alternator, and a voltage regulated load connected in parallel with said battery;

an improvement comprising:
   a resistive load connected between said DC voltage output of said alternator and said voltage regulated terminal of said battery and means connected in parallel with said resistive load for selectively shunting said resistive load in response to a control signal.

2. An improvement as in claim 1, wherein said resistive load is a heater element mounted in the air intake of an automotive engine to raise the intake air temperature.

3. An improvement as in claim 2, further including means for sensing the temperature of said intake air subsequent to its passing said heater element and producing said control signal indicative of said intake air exceeding a predetermined temperature to thereby cause said shunting means to shunt said heater element.

4. An improvement as in claim 1, wherein said resistive load is a window defogger heater element mounted to supply heat to a selected window.

5. An improvement as in claim 1, wherein said resistive load is a heater element mounted in a passenger compartment air circulation system to provide instantaneous heat to the air circulated within said passenger compartment.

6. An improvement as in claim 5, further including a means connected in parallel with said resistive load for shunting said resistive load in response to a control signal; and means for sensing said circulated air temperature and generating said control signal when said air temperature exceeds a predetermined value.

7. An improvement as in claim 5, provided as an auxiliary heating system to a vehicle having a conventional passenger compartment heater system utilizing an engine coolant heat exchanger; and said improvement further includes a means connected in parallel with said resistive load for shunting said resistive load in response to a control signal; and means for sensing the temperature in said engine coolant heat exchanger and generating said control signal when said temperature therein exceeds a predetermined value.

8. A circuit for providing a DC voltage across a resistive load in a voltage regulated electrical system including:

a storage battery having a pair of opposite polarity voltage terminals;

a mechanically driven alternator having a DC voltage output terminal and field coil current control terminal;

a voltage regulator electrically connected between one of said battery terminals and said field coil current control terminal;

a voltage regulated load electrically connected in parallel with said battery;

said resistive load employed as a heating element electrically connected between said DC voltage output terminal of said alternator and the common electrical connection of said voltage regulator and said one of said battery terminals, and;

means connected in parallel with said resistive load for shunting said resistive load, wherein said voltage regulator controls the field coil current to cause the alternator to supply sufficient DC voltage across both said resistive load and said battery to maintain a predetermined voltage value at said common electrical connection.

9. A circuit as in claim 8, wherein said shunting means comprises a set of contacts which are controllable to be shunt open or shunt closed and effect electrical shorting of said resistive load when said contacts are shunt closed.

10. An air intake preheat system for an internal combustion engine comprising:

means for receiving air into the engine;

a storage battery having opposite polarity voltage terminals;

an alternator, mechanically driven by said engine, providing a DC voltage output at an output terminal, and including a field coil current control terminal;

a voltage regulator electrically connected between one of said battery terminals and said field coil current control terminal;

an engine ignition system load electrically connected in parallel with said battery; and a resistive load mounted in said air receiving means and electrically connected between said alternator output terminal and said electrical connection of said voltage regulator to said battery, to supply heat to said received air.

11. An air intake heating system as in claim 10, further including means connected in parallel with said resistive load for shunting said resistive load in response to a control signal; and means connected to said shunting means for monitoring said heated air and generating said control signal indicative of said heated air exceeding a predetermined temperature.

* * * * *

UNITED STATES PATENT AND TRADEMARK OFFICE
CERTIFICATE OF CORRECTION

PATENT NO. : 4,188,527
DATED : February 12, 1980
INVENTOR(S) : William C. Follmer It is certified that error appears in the above-identified patent and that said Letters Patent are hereby corrected as shown below:

Assignee designation cancel "Ford Motor Company" and substitute --Ford Aerospace and Communications Corporation--

Signed and Sealed this

Eighth Day of July 1980

[SEAL]

Attest:

SIDNEY A. DIAMOND

Attesting Officer

Commissioner of Patents and Trademarks